2,795,505
Patented June 11, 1957

2,795,505

PRODUCTION OF HARD, ELASTIC WAXES WITH LOW SHRINKAGE

Emil Finck, Ludwigshafen (Rhine), and Georg Hummel, Mannheim, Germany, assignors to Badische Anilin- & Soda-Fabrik Aktiengesellschaft, Ludwigshafen (Rhine), Germany No Drawing. Application August 1, 1952,
Serial No. 302,254

Claims priority, application Germany September 29, 1951

9 Claims. (Cl. 106—38.6)

This invention relates to hard, elastic waxes with low shrinkage.

It has already been proposed to use natural or synthetic waxes or mixtures of the same for the production of simple wax intermediate models or patterns for casting purposes in mould casting processes. However in cases in which a specially good sharpness of the reproduction and the greatest possible retention of dimensions and hardness with simultaneous elasticity are required for the avoidance of deformation and fracture during the further working up of the wax models, for example in the production of precision castings for the construction of machines, jewellery and the like in metal injection moulding processes, the known natural and synthetic waxes and wax mixtures are not suitable because they are either too hard and insufficiently elastic or too soft and therefore too readily deformable. Moreover these waxes and wax mixtures exhibit too great a shrinkage (reduction in volume) upon transition from the liquid to the solid condition and during further cooling.

In order to increase elasticity it has already been proposed to employ mixtures of natural waxes, such as carnauba wax, candelilla wax or the like, as well as paraffin waxes and polymerized fatty oil, such as blown linseed oil or China-wood oil. It has been found, however, that such mixtures, when used repeatedly, undergo change and deposit insoluble precipitates, because in time the oils polymerize further and become insoluble. The properties of the wax mixtures also undergo change.

We have now found that hard, very elastic waxes which do not undergo change even when used repeatedly and which have very low shrinkage can be prepared by mixing esters of high molecular fatty acids and trihydric or higher polyhydric alcohols, which esters still have a hydroxyl number (i. e. which still contain one or more free alcoholic groups) with natural or synthetic resins which have an acid number or a hydroxyl number (i. e. which contain one or more free carboxylic or hydroxyl groups), in known manner, for example by melting them together, and then cross-linking them with small amounts, for example 5%, of polyfunctional compounds.

Esters which are suitable for the process are for example those from long-chain saturated fatty acids, such as stearic acid, hardened rape seed oil acid and ricinoleic acid, last runnings acids from the oxidation of paraffin wax, but preferably wax acids which are obtained by bleaching montan wax with a mixture of chromic acid and sulfuric acid, and trihydric or higher polyhydric alcohols, of which glycerine, butanetriol, hexanetriol, mannitol, trimethylolpropane, pentaerythritol and the like may be given as examples. The said components should be esterified so that they still have a hydroxyl number of at least 40. Among resins there are preferably used colophony and its esters with polyhydric alcohols. All natural or synthetic resins which have as high a hydroxyl or acid number as possible may, however, also be used. For the cross-linking there may be used all polyfunctional compounds which will react with hydroxyl or carboxylic groups. As examples there may be mentioned aliphatic and aromatic polycarboxylic acids and their derivatives, polyamines, chlorocarbonic acid esters or polyglycols and polyisocyanates.

Generally speaking the preparation is effected by melting the prepared ester with the resin at about 100° to 120° C. and then introducing the necessary amount of the polyfunctional compounds. The temperature is then gradually raised, for example to 160° to 180° C., and the whole kept at this temperature until the desired consistency, hydroxyl or acid number have been reached. Variations in the method of working, as for example in the choice of other temperatures, relative proportions and so on, are possible; they depend on the nature of the components.

The products thus prepared are more or less hard elastic waxes. They are distinguished by specially good sharpness of reproductions and by low shrinkage. The hardness may be regulated by the nature of the fatty acid component and the elasticity and the drip point may be regulated by the amount and nature of the resin and the polyfunctional compound. Generally speaking 10 to 20% of resin and about 2 to 10% of polyfunctional compound are sufficient, but other relative proportions may be used when special properties, as for example very great elasticity, are required.

The properties of the waxes thus obtainable may be still further improved, in particular their hardness and elasticity may be favourably influenced and their shrinkage during transition from the liquid to the solid state still further reduced, by incorporating amides of high molecular fatty acids and aliphatic, cycloaliphatic or aromatic mono-, di- or poly-amines.

Suitable amides are for example those of lauric acid, stearic acid, behenic acid and in particular oleic acid, linoleic acid, rape seed oil acid, ricinoleic acid and other high molecular fatty acids with one or more double linkages and/or hydroxyl groups. As the amine components of the amides there may be mentioned for example aniline, cyclohexylamine, hexamethyleneimine, and also propylamine, monopropanolamine, morpholine, dibutylamine, butylethanolamine, stearylamine, palmitylethanolamine, oleylamine, ethylene diamine, diethylene triamine, triethylene tetramine, diaminocyclohexane, phenylene diamine, 4.4'-diaminodiphenylmethane, 4.4'-diamino-biscyclo-hexylmethane and benzidine, as well as mixtures of such amines.

The amides may be added to the mixtures before, during or after the cross-linking. The amount of amide to be used may vary within wide limits; it is preferable to employ about 3 to 30%, advantageously 5 to 25% of amide with reference to the total amount of the final wax. The simultaneous employment of a plurality of different amides, in particular monoamides and diamides, has proved to be very suitable.

Waxes having very favourable properties are also obtained by incorporating rubber-like cross-linked products obtained by the above described action of polyfunctional compounds on mixtures of esters, still containing free hydroxyl groups, from high molecular fatty acids and polyalcohols or hydroxy-fatty acids or their esters and resin containing free hydroxyl or carboxylic groups, additionally natural or synthetic waxes or paraffin waxes, and if desired also the above described amides of high molecular fatty acids and primary or secondary amines. The addition of the natural or synthetic waxes or paraffin waxes, and if desired also of the amides, is effected after the cross-linking has taken place. The amount of the additional substances to be employed preferably amounts to more than 50%, advantageously 60 to 80% of the total amount of the final product. (When besides the waxes or paraffin waxes amides are added, these are employed in amounts between 3 and 30%, preferably between 5 and 25% of the final product.)

The following examples will further illustrate this invention but the invention is not restricted to these examples. The parts are by weight.

Example 1

70 parts of an ester (hydroxyl number 120) from pentaerythritol and a saturated fatty acid having 21 to 24 carbon atoms obtained by oxidation of paraffin wax are heated with 20 parts of the pentaerythritol ester of colophony (hydroxyl number 90) and 20 parts of the chlorocarbonic acid ester of 1.4-butanediol at 180° to 190° C. until the evolution of hydrogen chloride comes to an end and the mass thickens. A comparatively hard, very elastic wax is obtained having a drip point of 61° C.

Example 2

75 parts of an ester from hardened rape seed oil acid and 1.2.4-butanetriol (hydroxyl number 75) are heated with 18 parts of the glycerine ester of colophony (hydroxyl number 80) and 7 parts of sebacic acid at 190° to 200° C. until the hydroxyl number no longer decreases. A hard, very elastic wax is obtained having a drip point of 53° C.

Example 3

75 parts of the ester of trimethylolpropane and a wax acid mixture from the bleaching of montan wax with a mixture of chromic acid and sulfuric acid (hydroxyl number 80) are heated with 20 parts of colophony (acid value 164) and 5 parts of hexamethylene di-isocyanate slowly to 170° to 180° C. until the evolution of gas has ceased. The product obtained is a pale, hard, elastic wax having a drip point of 70° C.

Example 4

85 parts of the esterification product from pentaerythritol and montan wax acid (hydroxyl value 100) are heated with 12 parts of the glycerine ester of colophony (hydroxyl number 75) and 3 parts of toluylene di-isocyanate at 170° to 180° C. until the evolution of gas has ceased. A very hard, elastic wax having a drip point of 79° C. is obtained.

Example 5

82 parts of a cross-linked product from 85 parts of the ester of montan wax acid and pentaerythritol (hydroxyl number 100) 12 parts of the glycerine ester of colophony (hydroxyl number 75) and 3 parts of toluylene di-isocyanate are heated at about 150° C. with 13 parts of the amide from a last runnings fatty acid from the oxidation of paraffin wax and cyclohexylamine and 5 parts of the diamide of linoleic acid and 4.4'-diamino-bis-cyclohexylmethane until a homogeneous mass has been formed. A solid, amorphous, hard very elastic wax is obtained which has a very low shrinkage and which therefore is eminently suitable as a precision casting wax. Any desired coloring of the product may readily be obtained by the addition of dyestuffs.

Example 6

85 parts of a cross-linked product from 75 parts of the trimethylolpropane ester of wax acids from the bleaching of montan wax with a mixture of chromic acid and sulfuric acid (hydroxyl number 80 to 100), 20 parts of colophony and 5 parts of hexamethylene di-isocyanate are fused together with 15 parts of the anilide of rape seed oil acid until the mass has become homogeneous. The wax thus obtained is hard and very elastic; it has only a very slight shrinkage.

Example 7

50 parts of castor oil (hydroxyl number 170) and 40 parts of colophony are fused together at 80° C., 10 parts of toluylene di-isocyanate are added and the whole is then gradually heated to 170° C. until the slight evolution of gas has ceased. A tough, rubber-like mass is obtained. By adding 700 to 900 parts of a hard paraffin wax or a natural or synthetic hard wax, a product is obtained which is hard and very elastic.

Example 8

60 parts of the pentaerythritol ester of a last runnings fatty acid from the oxidation of paraffin wax (hydroxyl number 50) are fused together with 32 parts of an ester from colophony and trimethylolpropane (acid number 55) at 80° C., 8 parts of hexamethylene di-isocyanate are added, and the whole is then slowly heated to 170° C. until the slight evolution of gas has ceased. The resulting tough, rubber-like mass is then fused together with 800 parts of a natural hard wax, whereby a solid, very elastic wax product is formed.

Example 9

10 parts of castor oil (hydroxyl number 170) and 8 parts of colophony are cross-linked with 2 parts of toluylene di-isocyanate, and the resulting rubberlike product is fused together with 60 parts of crude montan wax, 10 parts of linoleic acid cyclohexane diamide and 10 parts of the propylamide of rape seed oil acid at 150° C. while stirring, until the mass has become homogeneous. The wax obtained has an excellent hardness and elasticity and only very slight shrinkage.

We claim:

1. A process for the production of a hard, elastic wax, having low shrinkage and being suitable as precision casting wax, which comprises (a) heating an esterification product with the hydroxyl number of at least 40 from an alcohol having at least three hydroxyl groups selected from the class consisting of glycerine, butane triol, trimethylol propane and pentaerythritol, and a montan wax acid with (b) a resin selected from the class consisting of colophony and its esters with polyhydric alcohols, said esters having a hydroxyl number of at least 40, (c) with a di-isocyanate which is a member of the group consisting of mononuclear arylene di-isocyanates and lower alkylene di-isocyanates and (d) a fatty acid amide.

2. A process for the production of a hard, elastic wax, having low shrinkage and being suitable as precision casting wax, which comprises (a) heating an esterification product with the hydroxyl number of at least 40 from an alcohol having at least three hydroxyl groups selected from the class consisting of glycerine, butane triol, trimethylolpropane and pentaerythritol, and a montan wax acid with (b) 10 to 20% of a resin selected from the class consisting of colophony and its esters with polyhydric alcohols, said esters having a hydroxyl number of at least 40 (c) with 2 to 10% of a di-isocyanate which is a member of the group consisting of mononuclear arylene di-isocyanates and lower alkylene di-isocyanates and (d) with 5 to 25% of a fatty acid amide.

3. A process for the production of a hard elastic wax, having low shrinkage and being suitable as precision casting wax, which comprises (a) melting an esterification product with the hydroxyl number of at least 40 from an alcohol having at least three hydroxyl groups selected from the class consisting of glycerine, butane triol, trimethylolpropane and pentaerythritol, and a montan wax acid with (b) 10 to 20% of a resin selected from the class consisting of colophony and its esters with polyhydric alcohols, said esters having a hydroxyl number of at least 40 and (c) heating to a temperature of from 160 to 180° C. with 2 to 10% of a di-isocyanate which is a member of the group consisting of mononuclear arylene di-isocyanates and lower alkylene di-isocyanates and (d) fusing together the mass with 5 to 25% of a fatty acid amide.

4. A process according to claim 3, wherein the di-isocyanate is hexamethylene di-isocyanate.

5. A process according to claim 3, wherein the di-isocyanate is toluylene di-isocyanate.

6. A process according to claim 5, wherein the ester of colophony is the glycerine ester.

7. A process according to claim 5, wherein the fatty acid amide is an amide containing the radical of an amine selected from the class consisting of aniline, cyclohexylamine, hexamethyleneimine, propylamine, monopropanolamine, morpholine, di-butylamine, butylethanolamine, stearylamine, palmitylethanolamine, oleylamine, ethylene diamine, diethylene triamine, triethylene tetramine, diaminocyclohexane, phenylene diamine, 4,4'-diaminodiphenylmethane, 4,4' - diamino - bis-cyclohexylmethane and benzidine and mixtures of said amines.

8. A process for the production of a hard, elastic wax, having low shrinkage and being suitable as precision casting wax, which comprises (a) heating at 170 to 180° C. until the evolution of gas has ceased 100 parts by weight of the esterification product with a hydroxyl number of at least 40 from pentaerythritol and montan wax acid with (b) 10 to 20 parts by weight of the glycerine ester of colophony, said ester having a hydroxyl number of at least 40; and (c) with 2 to 10 parts by weight of toluylene di-isocyanate which is a member of the group consisting of mononuclear arylene di-isocyanates and lower alkylene di-isocyanates and (d) heating at about 150° C. the product thus obtained with 5 to 25 parts by weight of a fatty acid amide.

9. A hard elastic wax having low shrinkage and being suitable as precision casting wax obtained by the process according to claim 8.

References Cited in the file of this patent

UNITED STATES PATENTS

| | | |
|---|---|---|
| 2,356,408 | Kelley | Aug. 22, 1944 |
| 2,367,712 | Bradley | Jan. 23, 1945 |
| 2,371,473 | Sanford | Mar. 13, 1945 |
| 2,427,255 | Burrell et al. | Sept. 9, 1947 |
| 2,563,142 | Walton | Aug. 7, 1951 |

FOREIGN PATENTS

| | | |
|---|---|---|
| 547,672 | Great Britain | Sept. 7, 1942 |